J. J. M. A. E. SCHNEIDER.
LANDING CARRIAGE FOR AIRCRAFT.
APPLICATION FILED JULY 8, 1920.

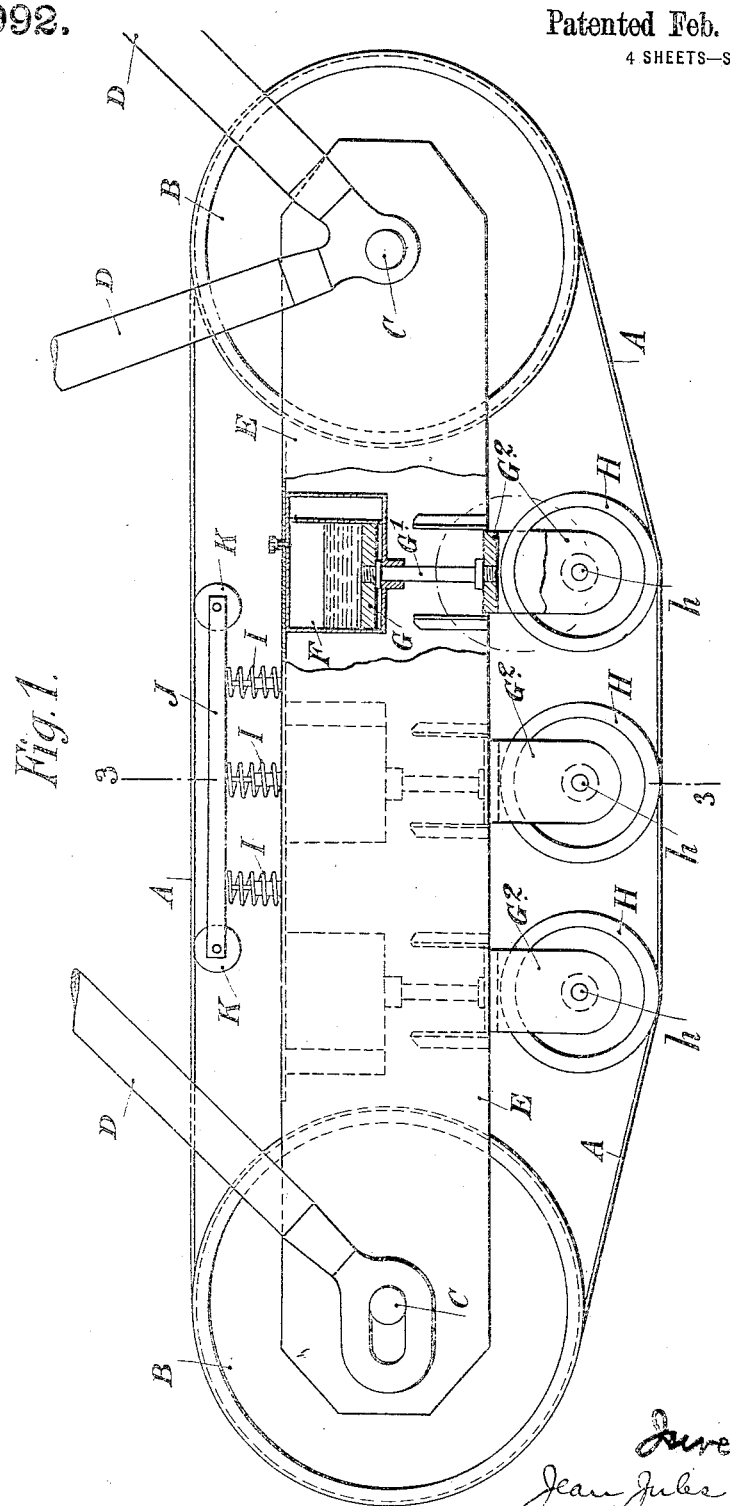

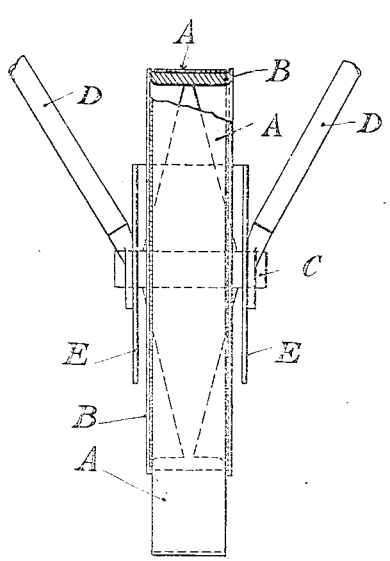
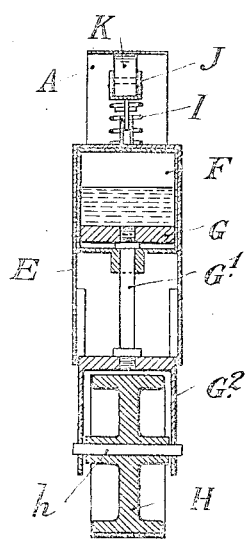

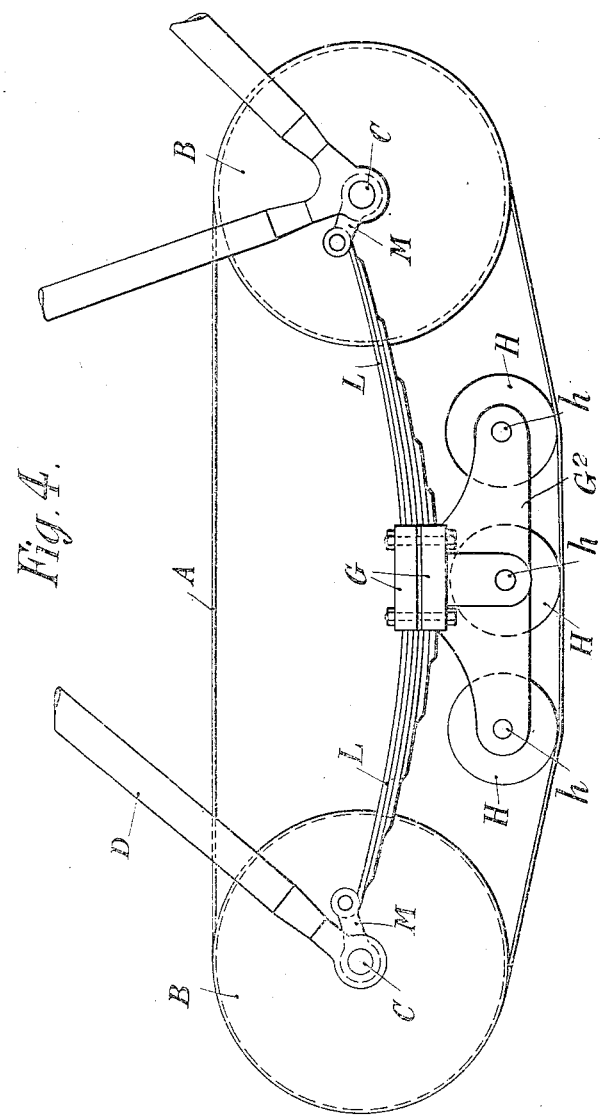

1,367,992.

Patented Feb. 8, 1921.

UNITED STATES PATENT OFFICE.

JEAN JULES MARIE ANTOINE EUGÈNE SCHNEIDER, OF PARIS, FRANCE.

LANDING-CARRIAGE FOR AIRCRAFT.

1,367,992. Specification of Letters Patent. Patented Feb. 8, 1921.

Application filed July 8, 1920. Serial No. 394,800.

*To all whom it may concern:*

Be it known that I, JEAN JULES MARIE ANTOINE EUGÈNE SCHNEIDER, a citizen of the Republic of France, resident of Paris, France, have invented new and useful Improvements in Landing-Carriages for Aircraft, which invention is fully set forth in the following specification.

This invention has for its object to provide an improved landing carriage for aircraft.

This improved landing carriage is characterized by an endless band such as a band of sheet metal, smooth, fluted or corrugated, arranged around guide pulleys formed by the main landing wheels, which are mounted on axles carried by the fuselage or a wing longitudinal of an aeroplane, or by any other fixed part of the aircraft. Between these axles or their support and the inner face of the bottom stretch of the endless band, there are interposed metal, pneumatic or hydro-pneumatic springs or buffers, which through the medium of supporting rollers, keep normally the said bottom stretch of the endless band taut and projecting beyond the under side of the guide pulleys formed by the main landing wheels.

In one constructional form of this invention the improved landing carriage may be combined with a set of wheels whereof the axle which is slidable in arms or brackets fixed to the supporting frame of the endless band, is maintained during flight, by the action of springs or elastic buffers, at the bottom of its stroke in a position such that the wheels will project beyond the under side of the taut endless band.

In the accompanying drawings Figures 1, 2 and 3 are respectively a longitudinal side elevation partly in section, and end elevation partly in section, and a vertical cross section on the line 3—3 of Fig. 1, of a first constructional form of the invention.

Fig. 4 is a longitudinal side elevation of a modification.

In these several figures, A is an endless band of sheet metal arranged around guide pulleys B formed by the main landing wheels, which are mounted on axles C carried by the fuselage D or a wing longitudinal in the case of an aeroplane, or by any other fixed part of an aircraft generally.

The bottom stretch of the endless band A is kept during flight taut and projecting beyond the underside of the guide pulleys or main landing wheels B by metal pneumatic, hydro-pneumatic or other springs or buffers interposed between the inner face of the said stretch and the axles C of the pulleys, or a chambered framing E carried by these axles.

In the example shown in Figs. 1, 2 and 3, hydro-pneumatic buffers are employed to keep the bottom stretch of the endless band taut. The cylinders F of these buffers are formed in or carried by the chambered framing E which is itself supported by the axles C of the pulleys B formed by the main landing wheels. In each cylinder F there works a piston G whose rod $G^1$ supports at its outer end by means of a block $G^2$, the axle $h$ of a roller H bearing upon the inner face of the bottom stretch of the endless band A.

The hydro-pneumatic buffers or springs may be of any suitable known type.

A tensioning device for the top stretch of the endless band may be arranged, as shown in Figs. 1 and 3, between the framing E and the inner face of this top stretch. It may consist of coiled springs I bearing at their bottom ends upon the framing E, and at their top ends against a beam J which carries rollers K at its ends.

During flight, the parts will occupy the positions shown in the figures. On landing, contact between the carriage and the ground can take place at any point of the projecting portion of the bottom stretch of the endless band. This contact will be made without shock owing to the compression of the air in the respective hydro-pneumatic buffers. As soon as the endless band comes into contact with the ground on the greater part of its extent, it will produce, by reason of the rather considerable adhesion, a braking action which will facilitate the landing. As the resilient means of the buffers is compressed by the momentum of the landing aircraft and the rollers H move upwardly, the main landing wheels B take the ground and mainly carry the load in the farther progress of the aircraft along the ground.

In the modification shown in Fig. 4, the tensioning device that keeps the bottom stretch of the endless band A taut and projecting beyond the underside of the pulleys B formed by the main landing wheels, comprises rollers H whose axles $h$ are carried in blocks $G^2$ formed on buckles G that hold the parts of a leaf spring. The long leaf L of this spring bears at its ends directly or through the medium of knuckles M, on the axles C of the guide pulleys B.

Figure 5:
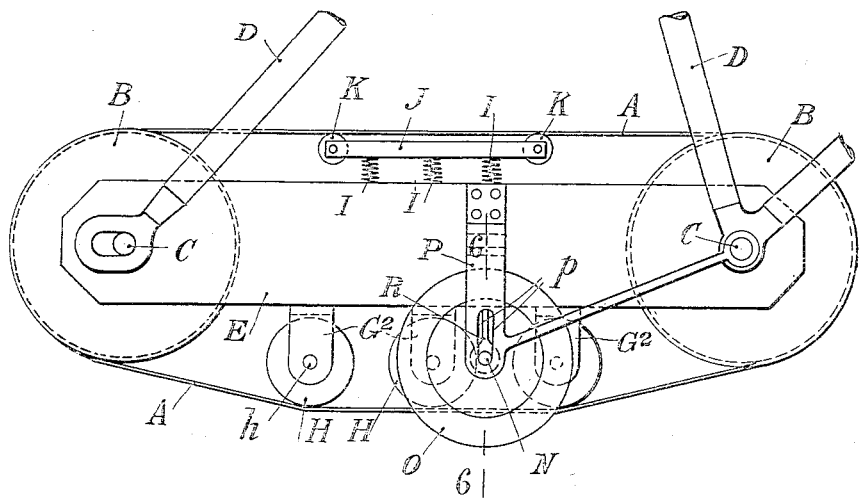
Figs. 5 and 6 are respectively a longitudinal side elevation and an end elevation partly in section on the line 6—6 of Fig. 5, of a constructional form wherein the improved landing carriage is combined with a suspended set of wheels for facilitating starting from the ground.
Figure 6:
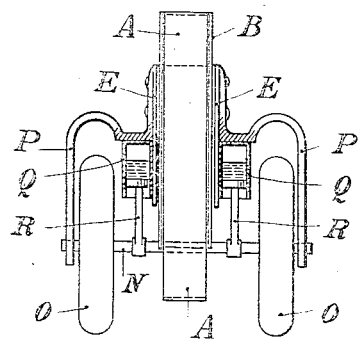

In the constructional form shown in Figs. 5 and 6, the landing carriage is combined with a set of auxiliary wheels O for facilitating the run for the start. The axle N of this set of wheels, is adapted to slide at its ends in guide slots $p$ formed in the arms or brackets P fixed to the framing E. Hydro-pneumatic or other springs keep the axle N at the bottom end of the guide slots $p$ during flight. These springs may be, for instance, hydro-pneumatic, the cylinder Q of each spring being carried by the respective bracket P, and the piston rod R being attached at its outer end to the axle N. When the set of auxiliary wheels occupies this position, the wheels O project beyond the under side of the bottom stretch of the endless band A, as indicated in the figures.

On starting, by reason of the action of the load, there is contact between the ground and the wheels O as well as the bottom stretch of the endless band A. Then immediately the ascensional force is sufficient to lift the machine slightly, the endless band A ceases to be in contact with the ground whereas the wheels O continue to be in contact with the ground.

Having now particularly described and ascertained the nature of my said invention and in what manner the same is to be performed, I declare that what I claim is:—

1. A landing carriage for aircraft comprising a frame longitudinally attached to a fixed part of the aircraft, landing wheels mounted at the opposite ends of the longitudinal frame and carrying an endless band extending above and below said frame, rollers carried by resilient means interposed between the lower stretch of the endless band and the longitudinal frame normally pressing the lower stretch of the endless band below the peripheries of the landing wheels to hold the band taut, said rollers and the engaged lower stretch of the band forming an initial yielding contact to engage the ground on landing, the landing wheels operating to take the ground after the yielding means carrying the rollers is compressed.

2. A landing carriage for aircraft comprising a chambered frame longitudinally attached to a fixed part of the aircraft, landing wheels mounted at the opposite ends of the chambered frame carrying an endless band extending above and below said frame, blocks vertically guided in the chambered frame carrying rollers bearing on the lower stretch of the endless band, and pressure exerting means within the chambered frame normally pressing the blocks downward to force the rollers against the endless band to project the lower stretch of said band below the peripheries of the landing wheels and to hold said band taut.

3. A landing carriage for aircraft comprising a chambered frame longitudinally attached to a fixed part of the aircraft, landing wheels mounted at the opposite ends of the chambered frame carrying an endless band extending above and below said frame, blocks vertically guided in the chambered frame carrying rollers bearing on the lower stretch of the endless band, pressure-exerting means within the chambered frame normally pressing the blocks downward to force the rollers against the endless band to project the lower stretch of said band below the peripheries of the landing wheels and to hold said band taut, and a tensioning device interposed between the upper side of the chambered frame and the upper stretch of the endless band to provide a tension for said band.

4. A landing carriage for aircraft comprising a chambered frame longitudinally attached to a fixed part of the aircraft, landing wheels mounted at the opposite ends of the chambered frame carrying an endless band extending above and below said frame, blocks vertically guided in the chambered frame carrying rollers bearing on the lower stretch of the endless band, pressure-exerting means within the pressure chamber normally pressing the blocks downward to force the rollers against the endless band to project the lower stretch of said band below the peripheries of the landing wheels and to hold said band taut, brackets projecting from opposite sides of the chambered frame, an axle mounted in the brackets to be vertically movable therein and carrying auxiliary landing wheels on opposite sides of the chambered frame, and pressure-exerting means interposed between the axle and brackets to force the axle and auxiliary landing wheels normally downward so that the peripheries of the auxiliary landing wheels extend below the lower stretch of the endless band.

5. A landing carriage for aircraft comprising a frame longitudinally attached to the fixed part of the aircraft, landing wheels mounted at the opposite ends of the frame carrying an endless band extending above and below said frame, blocks vertically movable on the frame carrying rollers bearing on the lower stretch of the endless band, pressure-exerting means normally pressing the blocks downward to force the rollers against the endless band to project the lower stretch of said band below the peripheries of the landing wheels and to hold said band taut, brackets on opposite sides of the frame, an axle mounted in the brackets to be vertically movable therein and carrying auxiliary landing wheels on opposite sides of the frame, and pressure exerting means interposed between the axle and the brackets to force the axle and the auxiliary landing wheels normally downward so that the peripheries of the auxiliary landing wheels extend below the lower stretch of the endless band.

Dated this 19th day of May, 1920.

In testimony whereof I have signed this specification.

JEAN JULES MARIE ANTOINE EUGÈNE SCHNEIDER.

Witnesses:
  ANDRÉ MOSTICKER,
  LOUIS GARDET.